May 7, 1957  G. M. SMITH  2,791,136
INDEXING DRUM FOR DRILL PRESS
Filed July 1, 1953  3 Sheets-Sheet 1

INVENTOR.
George M. Smith
BY
ATTORNEYS.

May 7, 1957 G. M. SMITH 2,791,136
INDEXING DRUM FOR DRILL PRESS
Filed July 1, 1953 3 Sheets-Sheet 2
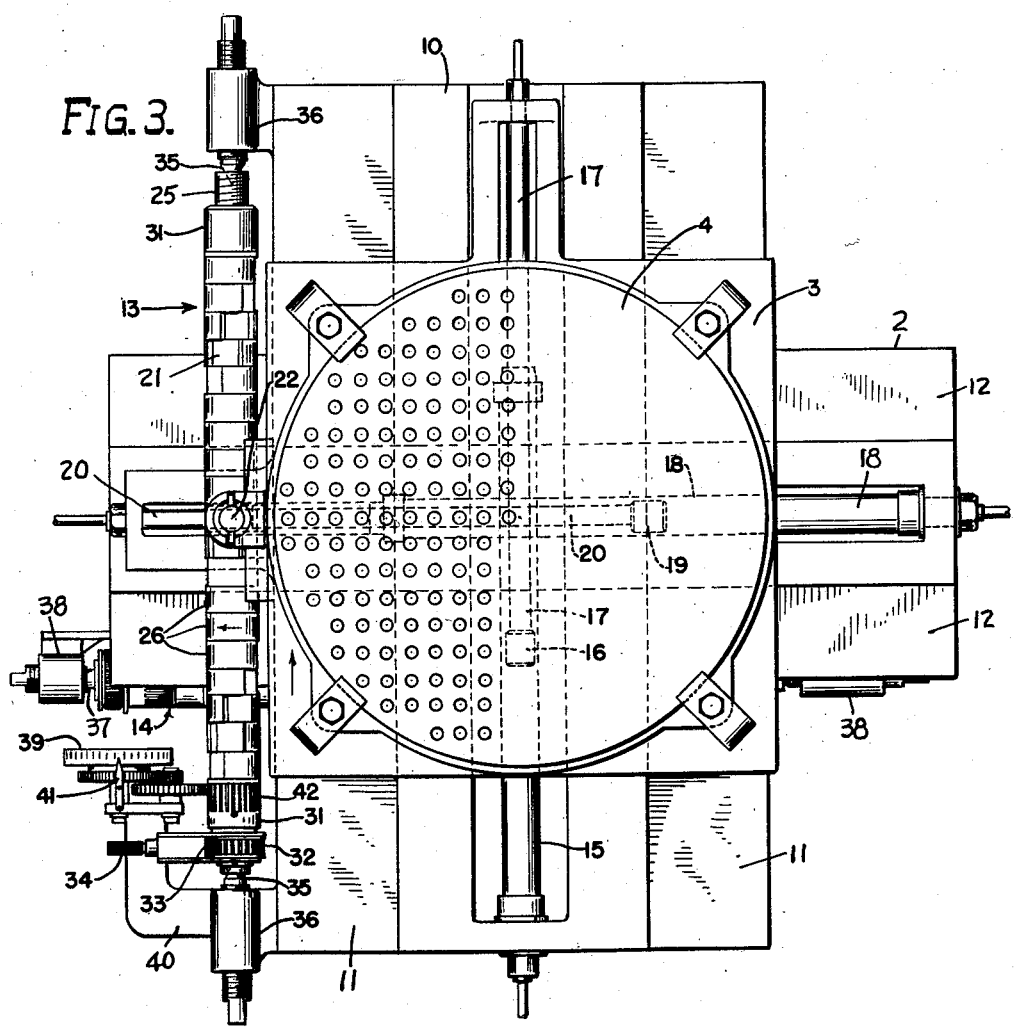
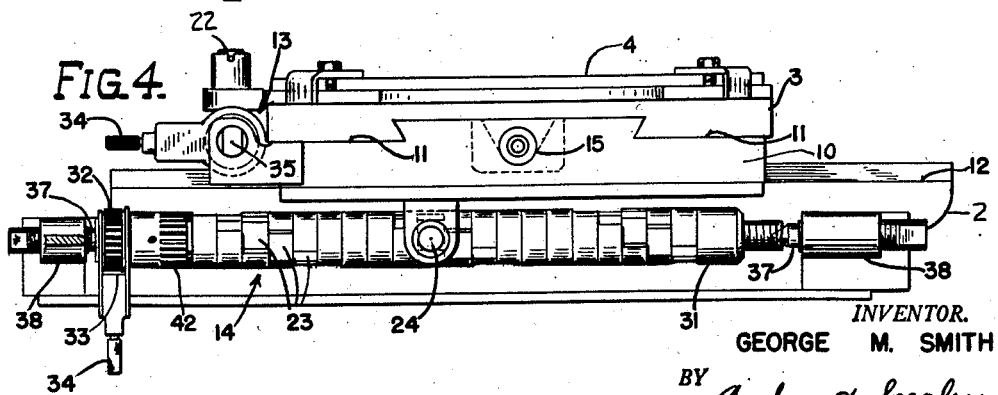
INVENTOR.
GEORGE M. SMITH
BY
ATTORNEYS

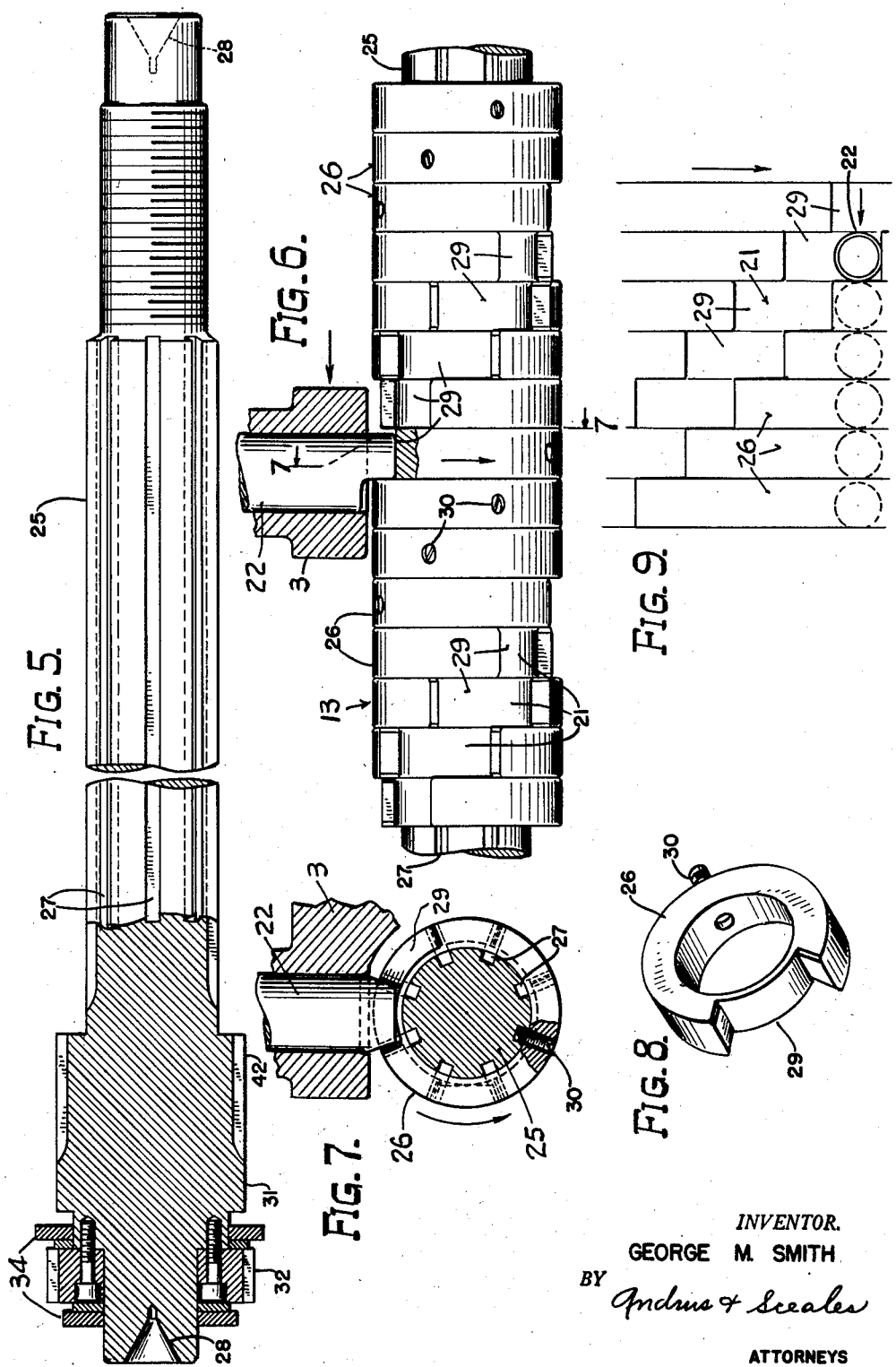

United States Patent Office 2,791,136
Patented May 7, 1957

2,791,136

INDEXING DRUM FOR DRILL PRESS

George M. Smith, Grafton, Wis., assignor to A. O. Smith Corporation, Milwaukee, Wis., a corporation of New York Application July 1, 1953, Serial No. 365,325

5 Claims. (Cl. 77—64)

This invention relates to indexing apparatus and more particularly to an indexing drum for a drill press.

An object of this invention is to provide means for automatically spacing the distance between holes to be drilled in tube sheets and the like.

Another object of this invention is to provide indexing apparatus which is easily and quickly assembled to minimize the set-up time for the machine.

Another object of this invention is to provide an indexing apparatus which is simply constructed, low in cost, and easily operated.

Briefly the invention as illustrated in the drawings consists of a drum made up of a shaft having a series of annular spacer rings placed thereon. The rings are of a width representing the distance between the holes to be drilled in the workpiece. Each ring has a portion of its periphery removed and these removed portions form a stepped spiral groove around the drum. A pin connected either to the worktable or to the drill support rides in the stepped spiral groove. During the drilling operation the pin rests in the removed portion of the periphery of one spacer ring and abuts the side of the adjacent ring. On completion of the drilling operation, the operator turns the drum releasing the pin from its abutting position, and a separate power source acting on the table or drill support effects a relative movement between the work and the drill causing the pin to abut against the side of the next adjacent spacer ring in preparation for the next drilling operation.

In order to provide indexing in cross-directions, two such drums are required. The two drums may be used in conjunction with the work to effect a relative movement of the work with respect to the tool, or they may both be used in conjunction with the tool to effect a relative movement of the tool with respect to the work. Or further, one drum might be used in conjunction with the work to effect relative movement of the work with respect to the tool in one direction, and the other drum might be used in conjunction with the tool to effect relative movement of the tool with respect to the work in the cross-direction.

In the drawings:

Fig. 3 is a plan view of the table of a drill press with the work clamped in place and showing the invention;

Fig. 4 is an end view of the table of Fig. 3;

Fig. 5 is an elevational view of the drum shaft partially in section and with a part broken away;

Fig. 6 shows a fragmentary elevational view of the drum shaft with spacer rings assembled thereon;

Fig. 7 is a transverse section on line 7—7 of Fig. 6 showing engagement of the top-pin;

Fig. 8 is a perspective view of an annual spacer ring element; and

Fig. 9 shows a development of the stepped spiral groove of the drum surface reduced to a plane with the stop-pin in a step of the groove, progressive positions of the pin being shown in dotted lines.

Figure 1:
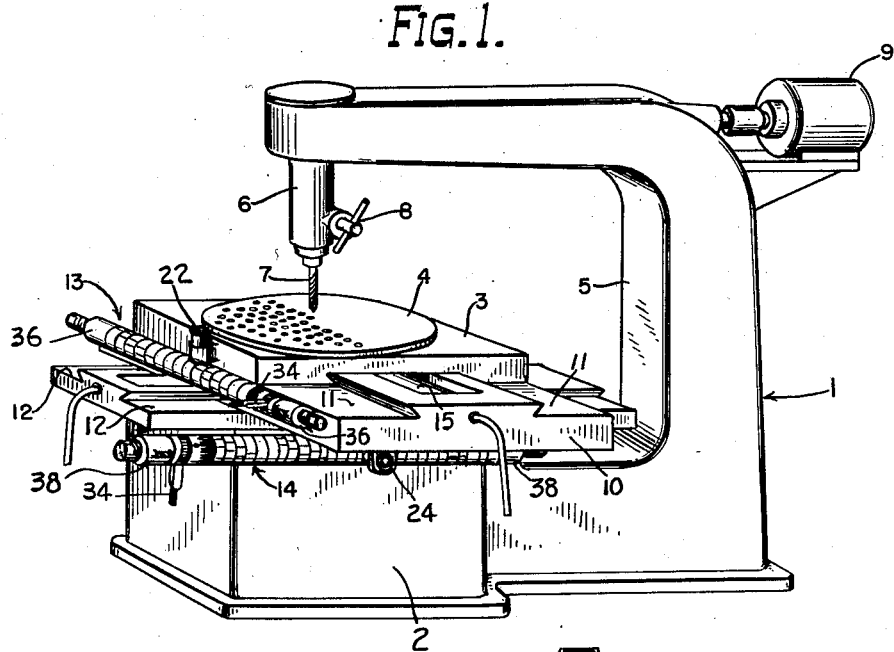
Figure 1 is a perspective view of a drill press showing the invention with the hole identifying means omitted.

In Figure 1 there is shown a drill press 1 having a bed 2 which rests on a suitable foundation. A table 3 is mounted on the bed 2 and is movable rearward and forward and right and left with respect to the bed. The workpiece 4 is clamped to the table 3 by any suitable means. A C-frame 5 extends rearwardly and upwardly from the bed 2 and supports the stationary head 6 which is positioned above the workpiece 4 by a lever 8 acting through suitable gearing. A motor 9 provides a drive to effect rotation of the tool 7 to perform the drilling operation.

The table 3 carrying workpiece 4 is mounted on a movable carriage 10 to permit right and left movement of the table with respect to the tool 7. The carriage 10 is formed with a pair of horizontal ways 11 on which table 3 may slide. The table 3 and carriage 10 are movably mounted on the bed 2 to permit backward and forward movement of the carriage and table with respect to the tool 7. The bed 2 is formed with a pair of horizontal ways 12 extending backward and forward normal to the ways 11 of carriage 10.

Movement of the table 3 with respect to the tool 7 is effected by hydraulic pressures constantly applied and is controlled by a pair of indexing drums 13 and 14. To effect right and left movement of table 3 a hydraulic cylinder 15 forms a part of carriage 10. A double-acting piston 16 is disposed in cylinder 15 with the piston rod 17 secured to the underside of table 3. Thus, pressures in cylinder 15 acting on piston 16 effect a right and left movement of table 3 with respect to the tool 7. A cylinder 18 is formed as part of the bed 2 and extends in a direction normal to cylinder 15. A double-acting piston 19 is disposed therein with its piston rod 20 secured to the underside of carriage 10 and table 3 with respect to the tool 7. The cylinders 15 and 18 are connected to a pressure source, not shown, and are maintained under a pressure at all times to effect movement of table 3 as controlled by indexing drums 13 and 14.

The indexing drum 13 to control the right and left movement of table 3 is rotatably secured to the front side of carriage 10. A stepped spiral groove 21 or cam is formed on the drum surface. A pin 22 attached to the front of table 3 extends downward from the table and engages the steps of groove 21 and thereby controls the movement of the table. To control rearward and forward movement of the table 3, the indexing drum 14 is rotatably secured to one side of the bed 2. The surface of drum 14 is formed with a stepped spiral groove 23 similar to groove 21 of drum 13. A pin 24 attached to the underside of carriage 10 is adapted to engage the steps of groove 23.

Because drums 13 and 14 are structurally alike and operate in similar fashion, the description following will be made as to drum 13. It will be understood that the description applies equally to indexing drum 14.

Basically drum 13 comprises a spline shaft 25 having a plurality of annular ring elements 26 disposed thereon. The spline shaft 25 is preferably formed with eight peripherally spaced splines 27 therein, one spline groove 27 every 45 degrees of the peripheral surface of shaft 25. The length of splines 27 is approximately equal to the travel of table 3 in the corresponding direction. The ends of shaft 25 are formed with conical depressions 28 to receive the holding means to be hereinafter described.

The annular ring elements 26 are of equal width and are otherwise alike in every respect. The inside diameter of the rings 26 correspond to the diameter of the spline portion of shaft 25. The outer periphery of each of the rings is formed with a circumferential recess 29 which, in combination with the recesses 29 of the other rings 26, defines the stepped groove 21 or cam. With a shaft having splines 27 formed 45 degrees apart, it is desirable to have the recess 29 represent a circular segment of twice the spline spacing, or 90 degrees.

Diametrically opposite from the center of the recess 29, each ring 26 is formed with a radial threaded hole which receives a set screw 30 adapted to engage spline grooves 27 and secure the rings 26 against rotary movement on the shaft.

Figure 2:
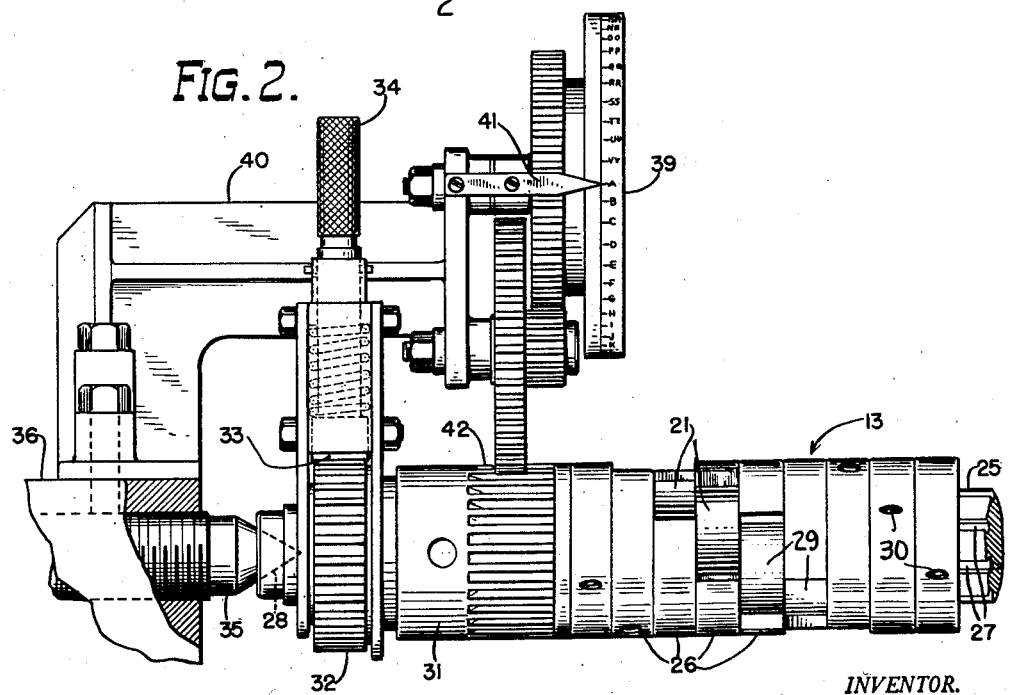
Fig. 2 is a fragmentary plan view of the invention and shows means for identifying the hole being drilled.

The individual ring elements 26 are placed on shaft 25 as shown in Figs. 2 and 6 with the recesses 29 in a staggered relation to form the stepped groove 21.

Each recess 29 is 45 degrees circumferentially offset from the recess of adjacent ring elements by the progressive engagement of set screws 30 with the circumferentially spaced spline grooves 27. Thus the set screw 30 for each ring will be 45 degrees removed from the set screw of the preceding ring and advanced 45 degrees from that of the preceding ring. The set screw of each ring is always peripherally advanced one spline groove over the set screw of the last adjacent ring. The number of rings to be disposed on the shaft 25 is dependent on the length of table travel of the machine. Assembled in this manner the recesses 29 of the ring elements 26 collectively form the stepped spiral groove or cam 21 on the drum 13 which is engaged by pin 22 attached to table 3. The surface contour of the drum is best shown in Fig. 6. Fig. 9 for purposes of illustration shows the drum surface of the drum 13 with the stepped spiral groove 21 developed in a plane.

To secure the ring elements 26 from movement longitudinally of shaft 25 lock members 31 are disposed on the shaft at each end of the assembled drum. A portion of the shaft 25 beyond the ends of the spline grooves 27 may be threaded to receive the lock members 31. Suitable set screws prevent the lock members 31 from unscrewing from the assembled drum. Shaft 25, however, may be designed so that one of the stop members 31 is formed as a part of the shaft, as shown in Fig. 5, in which event shaft 25 need be threaded only at one end to receive a lock member 31.

To rotate the indexing drum 13 a gear and pawl arrangement is provided. A gear 32 is keyed or otherwise secured to shaft 25 adjacent one end thereof and to the outside of lock member 31. Ordinarily gear 32 would be placed on the end of the drum 13 nearest the operator of the machine. A pawl 33 is adapted to engage gear 32 and is moved into engagement by a lever 34 which is then manually moved to rotate shaft 25 and drum 13.

The assembled drum 13 is rotatably mounted between a pair of spaced threaded pins 35 to the front side of carriage 10. The spaced pins 35 are axially aligned with drum 13 to maintain drum 13 in equivalent position with respect to carriage 10. The ends of the pins 35 engaging the drum 13 at the ends thereof, are conical corresponding to the conical depressions 28 of the shaft ends. Brackets 36 fastened to carriage 10 hold pins 35 in their respective positions. With drum 13 rotatably mounted in this manner, pin 22 fastened to table 3 will engage the stepped spiral groove 21 of the drum surface. Where desired only one of the pins 35 need be threaded through bracket 36 to hold drum 13 in place. The other pin would merely form a part of its holding bracket.

Indexing drum 14 is similarly supported at its ends, as drum 13, by spaced pins 37 secured in brackets 38 fastened to the bed 2 parallel to the bed ways 12. With drum 14 rotatably mounted in this manner, pin 24 secured to carriage 10 will engage the stepped spiral groove 23 of the drum surface.

Where the drums 13 and 14 are to be operated clockwise and the drums are accordingly assembled, the operator need merely move lever 34 of the appropriate drum through an angle of 45 degrees to advance the table preparatory to the next operation. As the lever is turned clockwise through 45 degrees the pawl 33 engages gear 32 of the corresponding drum and rotates the drum through a corresponding angle. The lever 34 with disengaged pawl may then be returned to its original position in preparation for the next table advance. Rotation of the drum 13 through 45 degrees effects a rotation of the entire groove 21 of the drum surface. The pin 22 fastened to table 3 and biased into engagement with a step of groove 21 is freed by the drum rotation from its engaged position. The pressure maintained in cylinder 15 at all times moves pin 22 into engagement with the next step of groove 21 and the table 3 which is connected to pin 22 moves a corresponding distance. Table 3 will move the width of one ring element 26 at which point the pin 22 will abut the side of the next adjacent ring element 26 or step to stop the advance of the table. Subsequent rotations of the drum by the operator will each time advance the table the width of one ring element 26. When all of the holes of that particular row are completed, the operator merely rotates the second drum effecting corresponding movement of the table for the next adjacent row. With the employment of double-acting pistons in the hydraulic system the drums may be used to advance the table in either direction. However, to operate the drums counterclockwise the pawl 33 must be set to engage the gear 32 in that direction. Fig. 9 shows the development of the drum surface in one plane and also shows how pin 21 fastened to table 3 advances with clockwise rotation of the drum surface.

Ordinarily if a workpiece requires a great many drilling operations, the operator is given a workchart which indicates by row and number where holes are to be drilled. In Fig. 2 is shown mechanism whereby the operator always knows what hole is being drilled by the machine. This may be accomplished by means of the calibrated indexing wheel 39 which rotates with the indexing drum. The calibrations on wheel 39 correspond to the number of ring elements 26 or positions in the advance of table travel. The wheel 39 is secured in position by means of a bracket 40 fastened by bolts or otherwise to bracket 36 nearest the operator. A pointer 41 secured to bracket 40 points to a single position on the wheel 39. Rotation of wheel 39 is brought about through a suitable gear train driven by gear 42 which forms part of the drum 13. In the embodiment shown in Fig. 2, the gear 42 forms a part of lock member 31 holding the ring elements 26 from longitudinal movement on shaft 25. When indexing drums 13 and 14 are both equipped with calibrated indexing wheels 39, one will indicate the row by alphabetical letters, and the other the hole number in that row by numeral. The work chart given the operator will call for corresponding rows and numbers by letter and numeral.

While the description herein was made in conjunction with a drill press having but one tool, it is easily adapted to multiple tool operations. Since table travel is a function of the width of the individual ring elements 26, multiple tool operation would merely require utilizing ring elements of a width corresponding to the number of tools in the bank, or several narrower ring elements 26 of proper width increment having recesses 29 longitudinally aligned to correspond to the number of tools in the tank. The described indexing apparatus is also adaptable to other machines wherein the workpiece and head move relatively to each other.

The use of this invention results in a great saving of time by the operator. Where previously it was necessary to scratch the hole spacing onto the surface of the workpiece by an appropriate instrument and according to exacting measurements, the automatic spacing provided by this invention completely eliminates this step. The operator was plagued with difficulties in aligning the tool with the scratched intersections on the workpiece. This difficulty is also eliminated by this invention.

With this invention set-up time is held to a minimum. If a new job requires spacing between holes different from the previous job, the indexing drum is easily removed from its position between the threaded pins and replaced by another drum having ring elements assembled of proper width. Or a new drum may be readily assembled on the same shaft by removing the ring elements and replacing them by others of proper width. Where spacing varies in the two directions of table travel, this variation is readily accommodated by use of proper indexing drums in the two directions of travel. Where spacing varies in a single direction of table travel, the invention also permits use of rings of varying width on a single shaft to accomplish the prescribed spacing.

Not only does the invention promote a high degree of accuracy at a saving in time and lend itself to great ease of operation, but the simple elements required are also easily constructed. Not only is the invention intended to be designed into new machines, but the simple construction is also readily adaptable to most existing drill presses.

Various embodiments of the invention may be employed within the scope of the following claims.

I claim:

1. In a machine tool having a base and a movable member carried by the base for movement in a straight line to control the relative position of the tool carrier and worktable, a rotatable shaft, stop members disposed adjacent the respective ends of said shaft, said shaft being formed with circumferentially spaced splines between said stop members, a plurality of annular elements being disposed on said shaft between said stop members, said stop members being adapted to secure said elements from longitudinal movement on said shaft, each of said elements having a segment of their outer periphery removed to provide a recess with the recesses arranged on said shaft to define a stepped cam, means connected to said elements to engage said splines to secure said elements against peripheral movement on the shaft, means to rotate said shaft, and an indexing member connected to said movable member and biased into contact with said cam to control the movement of said movable member, the rotation of the shaft freeing the indexing member to permit movement of said movable member equivalent to the width of one element in relatively positioning said tool carrier and said worktable.

2. An indexing apparatus for a machine tool having a work carrying member and a tool carrying member with said members being adapted to move relatively to each other in at least one direction, which comprises a rotatable shaft associated with said work carrying member, stop members disposed on said shaft adjacent the ends thereof, said shaft being formed with circumferentially spaced splines between said stop members, a plurality of annular ring elements disposed on said shaft between said stop members, said stop members being adapted to secure said elements from longitudinal movement on said shaft, each of said elements having a circumferentially extending recess and being arranged on said shaft with the recesses defining a spirally stepped cam, means connected to said elements and engaging said splines to secure the elements against peripheral movement on said shaft, means disposed on said shaft outwardly of one of said stop members to rotate the shaft and engaging means connected to said work carrying member and being biased into contact with said stepped cam, the rotation of said shaft effecting rotation of said cam and freeing of said engaging means to effect relative movement between the work carrying member and tool carrying member with the width of said annular elements being determinative of the amount of said relative movement between the members.

3. In a machine tool having a base and a tool carrying member, a movable table member disposed on said base and being adapted to move relatively in at least one direction to said tool carrying member, means connected to said table member to effect relative movement between said members, a rotatable shaft associated with said table member, stop members disposed on said shaft adjacent the ends thereof, said shaft being formed with a plurality of peripherally spaced splines extending between said stop members, a plurality of annular ring elements disposed on said shaft between said stop members, each of said annular elements having a segment of their outer periphery removed and being arranged on said shaft with the removed segments defining a stepped groove, means connected to each of said elements for engaging said splines and securing said element against peripheral movement on said shaft, means connected to the shaft for rotating said shaft, and engaging means connected to said movable table and biased into contact with a step of said groove, rotation of the cam freeing said engaging means from the engaged step to permit the first named means to effect relative movement between the tool carrying member and worktable with the width of the annular elements being determinative of the amount of said relative movement therebetween.

4. In a drill press having a base and a tool carrying member, a movable table member disposed on the base and being adapted to move relatively in at least one direction to said tool carrying member, means connected to the table member to effect relative movement between the members, a rotatable shaft associated with the table member, stop members disposed on the shaft adjacent the respective ends thereof, said shaft being formed with a plurality of circumferentially spaced splines extending between the stop members, a plurality of annular ring elements disposed on the shaft between the stop members, each of the annular elements being formed with a circumferential recess and being arranged on the shaft to form a stepped cam, means connected to each element being adapted to engage with the splines to secure the elements from peripheral movement on the shaft, means to rotate the shaft, means associated with the shaft to indicate the relative position between said tool carrying member and table member, and engaging means connected to the table member and biased into contact with said stepped cam, rotation of the cam freeing the engaging means with said first named means effecting relative movement between the tool carrying member and worktable, the width of the annular elements being determinative of the amount of said relative movement therebetween.

5. In a machine tool having a base and a movable member carried by the base for movement in a straight line to control the relative position of the tool carrier and work table, a rotatable shaft having disposed on the surface thereof a plurality of equally spaced longitudinal splines, stop members disposed adjacent the respective ends of said shaft, a plurality of annular elements disposed on said shaft in predetermined cooperative relationship with said splines and between said stop members, said annular elements each having a recess in the outer periphery thereof and being arranged on said shaft to define a stepped cam, means associated with said elements to engage said splines to secure said elements against peripheral movement on the shaft, means to rotate said shaft, and an indexing member connected to said movable member and biased into contact with said cam to control the movement of said movable member, the roattion of the shaft freeing the indexing member to permit movement of said movable member equivalent to the width of one element in relatively positioning said tool carrier and said work table.

References Cited in the file of this patent

UNITED STATES PATENTS

| | | |
|---|---|---|
| 1,217,572 | Craley | Feb. 27, 1917 |
| 2,020,868 | Barnes et al. | Nov. 12, 1935 |
| 2,299,082 | Elliott | Oct. 20, 1942 |

FOREIGN PATENTS

| | | |
|---|---|---|
| 14,259 | Great Britain | A. D. 1913 |
| 261,544 | Switzerland | Aug. 16, 1949 |